(12) United States Patent
Ikegawa (10) Patent No.: US 8,556,596 B2
(45) Date of Patent: Oct. 15, 2013

(54) WATER PUMP HAVING A CLUTCH

(75) Inventor: Atsutoshi Ikegawa, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 296 days.

(21) Appl. No.: 13/043,000

(22) Filed: Mar. 8, 2011

(65) Prior Publication Data

US 2011/0236231 A1    Sep. 29, 2011

(30) Foreign Application Priority Data

Mar. 25, 2010    (JP) ................. 2010-070948

(51) Int. Cl.
*F04B 49/02*    (2006.01)
*F16D 13/04*    (2006.01)
*F16D 13/14*    (2006.01)

(52) U.S. Cl.
USPC ............. 417/319; 192/40; 192/75; 192/76; 192/84.8

(58) Field of Classification Search
USPC ......... 417/223, 319; 192/84.8, 35, 40, 75, 76
See application file for complete search history.

(56) References Cited

U.S. PATENT DOCUMENTS

| | | | | |
|---|---|---|---|---|
| 2,481,084 A | * | 9/1949 | Claire | 192/75 |
| 3,137,236 A | * | 6/1964 | Aschaner | 417/223 |
| 4,460,076 A | * | 7/1984 | Yamada | 192/35 |
| 4,589,536 A | * | 5/1986 | Strikis et al. | 192/35 |
| 4,653,620 A | | 3/1987 | Czajkowski et al. | |
| 5,967,274 A | | 10/1999 | Leone et al. | |
| 6,343,680 B1 | | 2/2002 | Hakamada et al. | |

FOREIGN PATENT DOCUMENTS

| | | |
|---|---|---|
| DE | 10 2005 022 457 A1 | 11/2006 |
| EP | 0 203 406 A1 | 12/1986 |
| JP | 57-107440 A | 7/1982 |
| JP | 3-028527 A | 2/1991 |
| JP | 8-002423 Y2 | 1/1996 |
| JP | 11-201191 A | 7/1999 |
| JP | 2001-200860 A | 7/2001 |

OTHER PUBLICATIONS

Extended European Search Report dated Dec. 7, 2012, issued by the European Patent Office in the corresponding European Application No. 11155351.7. (4 pages).

* cited by examiner

*Primary Examiner* — Charles Freay
(74) *Attorney, Agent, or Firm* — Buchanan Ingersoll & Rooney PC (57) ABSTRACT

A water pump for a vehicle includes a power transmission member driven and rotated by an external power, a driven shaft driven to be rotatable independently from the power transmission member, an impeller, an arm member which includes a pressing portion pressing the power transmission member and which is contactable to the power transmission member for transmitting a rotation of the power transmission member to the driven shaft, a control member controlling the arm member so that the arm member and the power transmission member come in contact with each other or come out of contact from each other and so that a contact state between the arm member and the power transmission member is variable, and a biasing member biasing the arm member toward the power transmission member.

15 Claims, 6 Drawing Sheets

WATER PUMP HAVING A CLUTCH

CROSS REFERENCE TO RELATED APPLICATIONS

This application is based on and claims priority under 35 U.S.C. §119 to Japanese Patent Application 2010-070948, filed on Mar. 25, 2010, the entire content of which is incorporated herein by reference.

TECHNICAL FIELD

This disclosure relates to a water pump for a vehicle, which includes a mechanism for controlling rotation of an impeller.

BACKGROUND DISCUSSION

A known clutch that controls a contact condition between an armature and a pulley is disclosed in JPH3-28527A. According to the clutch disclosed in JPH3-28527A, the armature and a hub is connected with each other by means of a plate spring, and a transfer torque pulsation absorbing mechanism is accommodated inside the hub.

According to a known clutch disclosed in JPS57-107440A, inner clutch parts and a friction plate are arranged on a driving shaft, and engage with each other. The inner clutch parts are provided at the side of an inner circumference of an outer clutch part (corresponding to a pulley of the present disclosure) and the friction plate is provided so as to be in contact with side portions of the inner clutch parts. Disc springs press the friction plate against the side portions of the inner clutch parts from a direction opposite to a surface of the friction plate that faces the inner clutch parts.

A known friction clutch disclosed in JP2001-200860A includes a rotor, a boss attached to a driven shaft, an intermediate member pivotably attached to the boss and an initial operation means. The rotor, which is rotatably supported by the driven shaft and is driven by an external power, includes a friction surface on one side. The intermediate member includes a friction surface that is contactable to and engageable with the friction surface of the rotor. The intermediate member transfers a friction force generated between the friction surface of the intermediate member and the friction surface of the rotor into a pressing force against the rotor. The initial operation means supplies a relatively small force (an initial force) to the intermediate member. By the initial force, the friction surface of the intermediate member is started to be pressed against the friction surface of the rotor.

A known electromagnetic clutch disclosed in JPH8-2423Y includes a solenoid, a pulley, an inner coupling member, an outer coupling member, an armature plate and a friction plate. The solenoid is fixedly attached to an outer circumference of an end portion of a bearing housing. The pulley is rotatably supported via a bearing at an outer circumference of an end portion of a driving shaft of a water pump, the driving shaft being rotatably inserted into the bearing housing. The inner coupling member is rotatably supported via the bearing at the outer circumference of the end portion of the driving shaft. The outer coupling member is fixedly attached to the outer circumference of the end portion of the driving shaft so as to face the inner coupling member via a viscous fluid for serving as a fluid coupling. The armature plate is fixedly attached to the outer coupling member and faces the solenoid via the pulley. The friction plate made of a magnetic material is attached to a side portion of the armature plate, the side portion facing the pulley, so as to face the solenoid via the pulley.

According to the electromagnetic clutches disclosed in JPH3-28527A and in JPH8-2423Y, a clutch-pressing force pressing the clutch for transferring the torque depends on an attraction force of an electromagnetic coil. Therefore, in case that the electromagnetic clutch is used in the water pump, the clutch-pressing force needs to be increased particularly when an engine speed is high. Consequently, a high current is needed for the electromagnetic coil to generate a large attraction force, and thus a size and a cost of the electromagnetic clutch increase. In addition, in a magnetic point of view, the electromagnetic clutch needs to be thick enough to assure thicknesses of the pulley and the armature, both of which constitute a magnetic circuit, and thus a weight of the electromagnetic clutch increases.

The centrifugal clutch disclosed in JPS57-107440A needs no power for operation, however, conditions for the engagement and disengagement between the inner and the friction plate are determined by the number of rotations of an input shaft. It may be therefore difficult to change the operation state of the water pump at an arbitrary timing in case that the centrifugal clutch disclosed in JPS57-107440A is used in the water pump.

According to the friction clutch disclosed in JP2001-200860A, a rotation axis of the electromagnetic coil is positioned on a rotation axis of the driven shaft, and an armature portion (corresponding to an armature of the present disclosure) is attracted when the electromagnetic coil is energized. However, an electromagnetic force generated by the electromagnetic coil works partly on the armature portion because plural armature portions are arranged discretely. Consequently, the friction clutch disclosed in JP2001-200860A may include an inefficient magnetic circuit, and thus the electromagnetic coil and the friction clutch need to be increased in seizes for attracting the armature portions.

A need thus exists for a water pump for a vehicle, which is not susceptible to the drawback mentioned above.

SUMMARY

According to an aspect of this disclosure, a water pump for a vehicle includes a power transmission member driven and rotated by an external power, a driven shaft driven to be rotatable independently from the power transmission member, an impeller to which a rotation of the driven shaft is transmitted, an arm member including a pressing portion which presses an inner circumferential surface of the power transmission member and being contactable to the power transmission member for transmitting a rotation of the power transmission member to the driven shaft, a control member controlling the arm member so that the arm member and the power transmission member come in contact with each other or come out of contact from each other and so that a contact state between the arm member and the power transmission member is variable, and a biasing member provided at the control member for biasing the arm member toward the power transmission member, wherein the control member changes a rotational phase between the power transmission member and the arm member so that the arm member and the power transmission member come in contact with each other or come out of contact from each other and so that the contact state between the arm member and the power transmission member is controlled.

According to another aspect of this disclosure, a water pump for a vehicle, includes a power transmission member driven and rotated by an external power, a driven shaft driven to be rotatable independently from the power transmission member, an impeller to which a rotation of the driven shaft is transmitted, an arm member for transmitting a rotation of the power transmission member to the driven shaft, a pressing portion provided on the arm member and positioned to face an inner circumferential surface of the power transmission member, a control member controlling the arm member, and a biasing member biasing the arm member toward the power transmission member, wherein the biasing member allows the inner circumferential surface of the power transmission member and the pressing portion to come in contact with each other when the arm member is under no control of the control member and wherein the biasing member allows the inner circumferential surface of the power transmission member and the pressing portion to come out of contact from each other when the arm member is under a control of the control member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of this disclosure will be explained with reference to illustrations of FIGS. 1 to 3 as follows.

Figure 1:
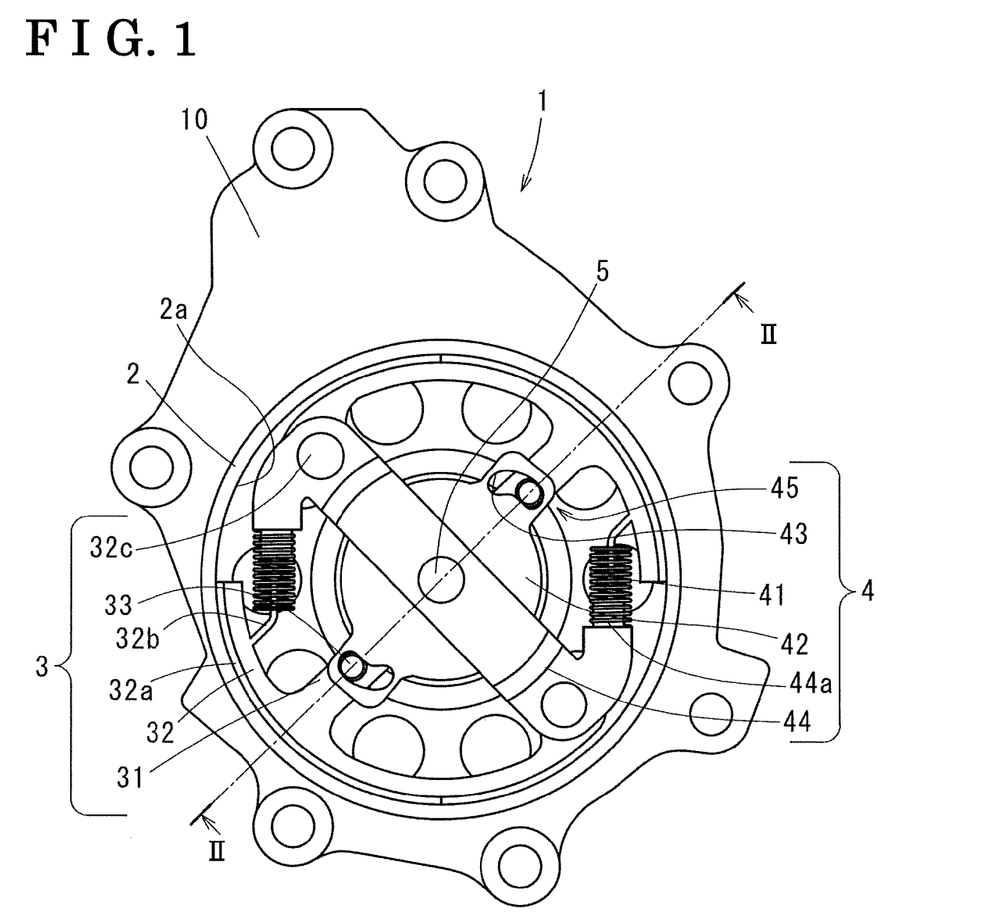
FIG. 1 is a detailed view of a structure of a water pump for a vehicle according to a first embodiment disclosed here.

As shown in FIG. 1, a water pump 1 for a vehicle (hereinafter referred to as a water pump) according to a first embodiment includes a pump housing 10 having a water inlet and a water outlet, a pulley 2 (serving as a power transmission member) driven and rotated by a power of an internal combustion engine, a frictional portion 32a (serving as a pressing portion) positioned so as to face and press an inner circumferential surface 2a of the pulley 2, an arm member 3 including the frictional portion 32a and being contactable with the pulley 2 for transmitting a rotation of the pulley 2 to a driven shaft 5. A coolant water is pumped out via the water outlet to portions of the vehicle where the water coolant is needed, for example, an internal combustion engine, and returns into the water pump 1 via the water inlet. The water pump 1 also includes a control member 4. The control member 4 controls the arm member 3 so that the arm member 3 and the pulley 2 come in contact with each other or come out of contact from each other, and so that a contact state (a half-engaged state) between the arm member 3 and the pulley 2 is variable. The water pump 1 further includes a first spring 41 (serving as a biasing member) provided at the control member 4 for biasing the arm member 3 toward the inner circumferential surface 2a of the pulley 2, and a joint portion 45 including a pin 33 provided at the arm member 3 and a long hole 43 formed on the control member 4. The long hole 43 includes a first end portion 43a (serving as an end portion) and a second end portion 43b (serving as an end portion).

The arm member 3 includes an arm portion 32, a projecting portion 31 and the frictional portion 32a. The arm portion 32 is formed in a manner to extend in a circumferential direction of the pulley 2 and thus to face the inner circumferential surface 2a. The projecting portion 31 is formed on the arm portion 32 in a manner to project toward a rotational center of the driven shaft 5. The projecting portion 31 is provided with the pin 33. The frictional portion 32a is provided on an outer circumference of the arm portion 32 so as to face the inner circumferential surface 2a for frictionally engaging with the inner circumferential surface 2a of the pulley 2. The arm member 3 also includes the pin 33, a first connection portion 32b and a second connection portion 32c. The pin 33 is inserted into the long hole 43 of the control member 4. The first connection portion 32b is connected to the first spring 41 biasing the arm member 3 toward the inner circumferential surface 2a of the pulley 2. The second connection portion 32c is connected to the control member 4 so that the arm member 3 is pivotable relative to the control member 4.

The control member 4 includes an armature 42 (serving as a magnetically-attracted portion) and a driver 44. The armature 42 is moved in an axial direction of the driven shaft 5 when electricity is supplied to a magnetic coil 6 (FIG. 2) and the magnetic coil 6 is energized. The magnetic coil 6 serves as a driving portion. The driver 44 includes an end portion 44a and the first spring 41 provided at the end portion 44a. The driver 44 is connected to the second connection portion 32c of the arm member 3. The armature 42 is formed with the long hole 43 that causes the arm member 3, in particular a portion of the arm member 3 near the first connection portion 32b, in order to move in a direction away from the pulley 2. The end portion 44a of the driver 44 is formed so as to extend in the circumferential direction of the pulley 2.

Figure 2:
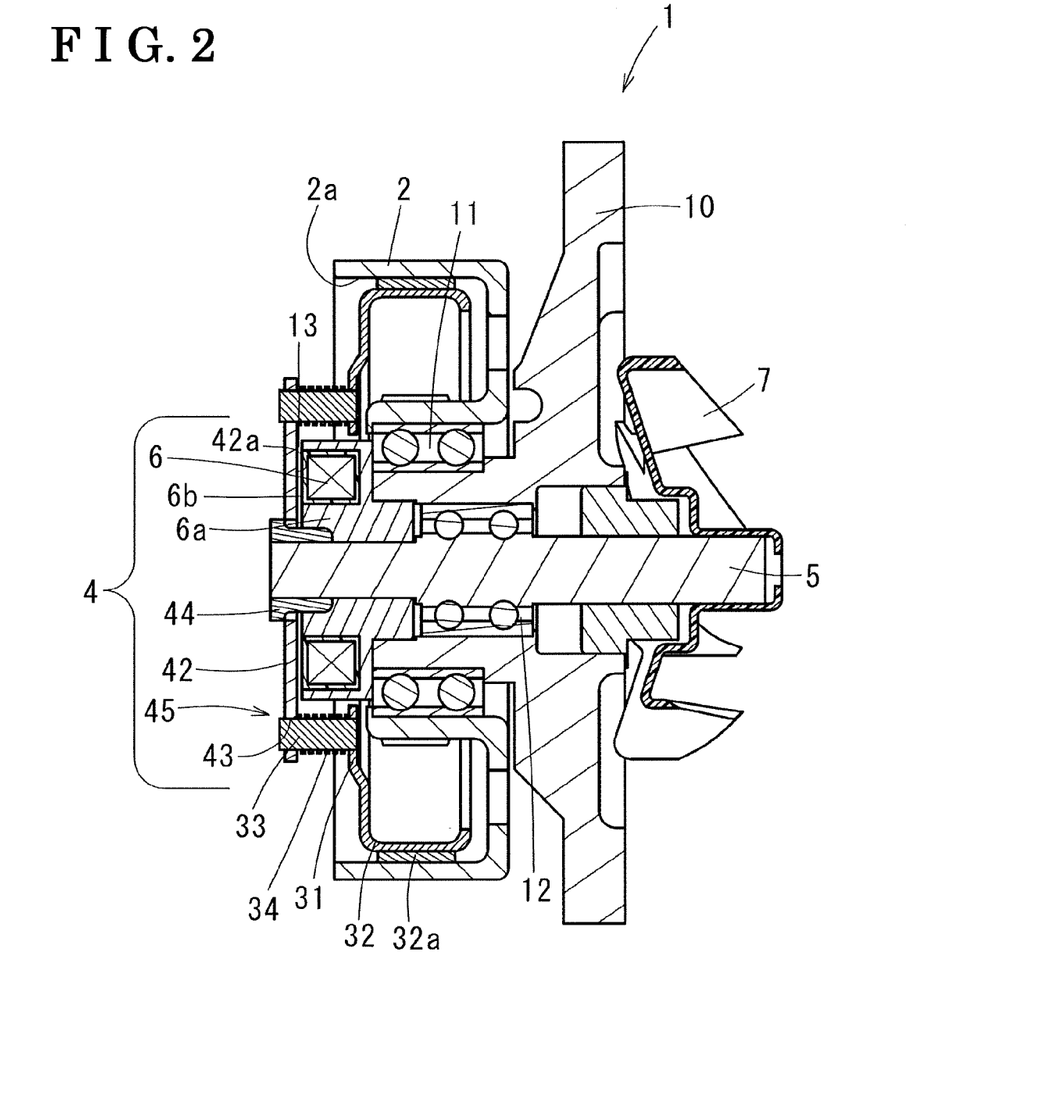
FIG. 2 is a section view taken on line II-II illustrated in FIG. 1.

As shown in FIG. 2, the water pump 1 includes a first bearing 11 disposed between the pulley 2 and the pump housing 10, a second bearing 12 disposed between the driven shaft 5 and the pump housing 10. The water pump 1 also includes the magnetic coil 6 included in the control member 4 and fixedly housed in the pump housing 10, and a core 6a including an attraction face 6b. An entire surface of the attraction face 6b faces the armature 42. The magnetic coil 6 applies an electromagnetic force, that is, an attraction force, to the armature 42 for attracting the armature 42 so that the armature 42 is pulled by the electromagnetic force and moved in the axial direction of the driven shaft 5 toward the attraction face 6b. Between the armature 42 and the core 6a, an air gap 13 is provided. The air gap 13 includes a predetermined gap formed between the attraction face 6b of the core 6a and the an attraction face 42a of the armature 42 due to a biasing force of a second spring 34 for biasing the armature 42 in a direction away from the magnetic coil 6.

One end portion of the driven shaft 5 is coupled to the driver 44 and the other end portion of the driven shaft 5 is coupled to an impeller 7. The impeller 7 refers to a driven portion to which a rotation of the driver 44 and the arm member 3 is transmitted.

Figure 3A:
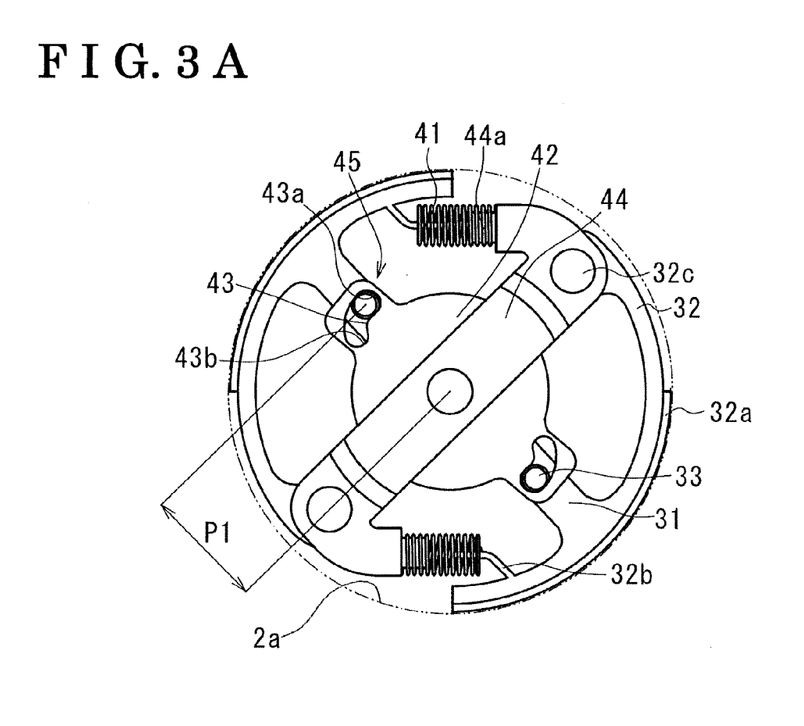
FIG. 3A is a detailed view illustrating operations of an arm member and a control member according to the first embodiment.

As shown in FIG. 3A, when the pin 33 is positioned at the first end portion 43a of the long hole 43, that is, closer to the first end portion 43a than to the second end portion 43b, the arm member 3 is biased (pushed) by the first spring 41 toward the inner circumferential surface 2a of the pulley 2 and thus is engaged with the pulley 2. The shape of the long hole 43 is formed in a manner that the pin 33 moves toward the first end portion 43a so that the arm member 3 engages with the pulley 2 even when the frictional portion 32a of the arm member 3 is worn out to be reduced in a radial thickness caused by an engagement between the frictional portion 32a and the inner circumferential surface 2a of the pulley.

Figure 3B:
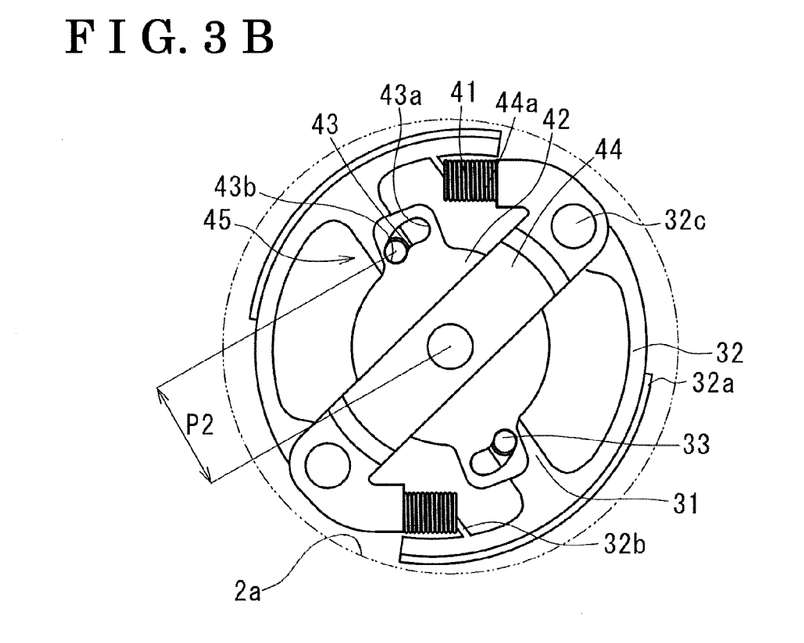
FIG. 3B is a detailed view illustrating the operations of the arm member and the control member according to the first embodiment.

When the pin 33 is positioned at the second end portion 43b of the long hole 43, that is, closer to the second end portion 43b than to the first end portion 43a, as shown in FIG. 3B, the frictional portion 32a of the arm member 3 moves toward the driven shaft 5, that is, closer to a rotation axis of the pulley 2, and is away from the inner circumferential surface 2a of the pulley 2. When the frictional portion 32a moves away from the inner circumferential surface 2a, the arm member 3, in particular the portion of the arm member 3 near the first connection portion 32b, moves closer to the rotation axis of the pulley 2, that is, the portion of the arm member 3 near the first connection portion 32b pivots about the second connection portion 32c toward the rotation axis of the pulley 2, thereby compressing the first spring 41. Thus, a radius defined by the arm member 3 in FIG. 3B, where the frictional portion 32a of the arm member 3 is moved toward the driven shaft 5, is smaller than that in FIG. 3A.

As shown in FIGS. 3A and 3B, the long hole 43 is formed in such a manner that a distance P1 and a distance P2 differ from each other. The distance P1 refers to a distance between the pin 33 and the rotation axis of the driven shaft 5 when the pin 33 is positioned between the first end portion 43a and the second end portion 43b. The distance P2 refers to a distance between the pin 33 and the rotation axis of the driven shaft 5 when the pin 33 is positioned at the second end portion 43b. The first spring 41 is gradually compressed by up to a difference between the distance P1 and the distance P2, and thus the arm member 3 moves away from the inner circumferential surface 2a of the pulley 2. The frictional portion 32a of the arm member 3 may be worn out to be reduced in the radial thickness. As the frictional portion 32a becomes thinner, the distance P1, that is, the distance between the pin 33, which is positioned between the first end portion 43a and the second end portion 43b, and the rotation axis of the driven shaft 5 becomes longer.

The long hole 43 includes at least one end portion, that is, the second end portion 43b for restricting a range of a movement of the pin 33. As the pin 33 inserted into the long hole 43 moves along a shape of the long hole 43 from the first end portion 43a toward the second end portion 43b, the pin 33 moves in a radial direction of the pulley 2 toward the rotation axis of the pulley 2. According to the first embodiment, the long hole 43 includes the first end portion 43a and the second end portion 43b, however, this structure described in the first embodiment is an example and this disclosure is not limited thereto. The long hole 43 may include only the second end portion 43b, in other words, the long hole 43 may refer to a notch having an opening at a circumferentially opposite end portion to the second end portion 43b as long as a similar function to when the long hole 43 includes the first end portion 43a and the second end portion 43b is obtained. According to the first embodiment, the long hole 43 is formed to have an arc-shape, however, the long hole 43 may be formed to have a linear shape. In case that the long hole 43 is formed to have the arc-shape, the first spring 41 is prevented from compressing rapidly.

An operation of the water pump 1 according to the first embodiment will be described hereunder. The pulley 2 in the first embodiment rotates counterclockwise in FIG. 1.

An operation state of the water pump 1 changes depending on a state of a warm-up in the portions of the vehicle, for example, the internal combustion engine. For example, when the engine is at low temperatures, the operation of the water pump 1 is stopped to stop the coolant water from circulating in the engine, thereby facilitating an appropriate warm-up of the engine. When the engine is at high temperatures, the water pump 1 is operated to circulate the coolant water in the engine, thereby maintaining the engine at an appropriately warmed-up state. A temperature at which the engine is appropriately warmed-up varies with vehicles on which the water pump 1 is mounted.

When the water pump 1 is in an operating state (an initial state), the magnetic coil 6 is not excited (a de-energized state). At this time, the pin 33 is positioned at the first end portion 43a of the long hole 43, and the first spring 41 biases the arm member 3 toward the inner circumferential surface 2a of the pulley 2 as shown in FIG. 3A. The frictional portion 32a of the arm member 3 engages with the inner circumferential surface 2a of the pulley 2 and thus the arm member 3 rotates with the pulley 2. As the arm member 3 rotates, the rotation of the arm member 3 is transmitted to the impeller 7 via the driven shaft 5, and thus the water pump 1 is operated. When the pulley 2 and the arm member 3 engage and rotate synchronously with each other, the engagement between the pulley 2 and the arm member 3 becomes securer due to a biasing force of the first spring 41 and a centrifugal force generated by the rotation of the arm member 3. When the pulley 2 and the arm member 3 are in the half-engaged state, the rotation of the pulley 2 is transmitted to the arm member 3 while allowing a slippage between the pulley 2 and the arm member 3. Thus, the impeller 7 rotates at a smaller rotation force than that of the pulley 2.

To transit the state of the water pump 1 from the operating state to a stopped state, the magnetic coil 6 comes to be excited (an energized state), thereby attracting the armature 42 toward the attraction face 6b of the magnetic coil 6. When the armature 42 is attracted by the magnetic coil 6 and stops rotating, the pin 33 of the arm member 3 moves to be positioned at the second end portion 43b of the long hole 43. As the pin 33 moves to be positioned at the second end portion 43b, the frictional portion 32a of the arm member 3 moves away from the inner circumferential surface 2a of the pulley 2 so as to move toward the driven shaft 5, that is, closer to the rotation axis of the pulley 2. In other words, the frictional portion 32a of the arm member 3 pivots about the second connection portion 32c toward the end portion 44a of the driver 44 by up to the difference between the distance P1 and the distance P2 shown in FIGS. 3A and 3B. As the frictional portion 32a of the arm member 3 moves closer to the rotation axis of the pulley 2 and the first connection portion 32b of the arm portion 32 moves toward the end portion 44a of the driver 44, the first spring 41 is compressed by up to the difference between the distance P1 and the distance P2. Consequently, the frictional portion 32a moves away from the inner circumferential surface 2a toward the rotation axis of the pulley 2, and thus transmission of the rotation of the pulley 2 to the impeller 7 is stopped, thereby stopping the operation of the water pump 1.

To transit the state of the water pump 1 from the stopped state to the operating state, the magnetic coil 6 is stopped (a stopped state), and thus the armature 42 moves away from the attraction face 6b of the magnetic coil 6 so as to be rotatable. The pin 33 moves from the second end portion 43b toward the first end portion 43a of the long hole 43 because the first spring 41 biases the arm member 3 toward the inner circumferential surface 2a. When the frictional portion 32a of the arm member 3 engages with the inner circumferential surface 2a of the pulley 2, the water pump 1 starts operating. Thus, the control member 4 controls the arm member 3 so that the arm member 3 and the pulley 2 come in contact with each other or come out of contact from each other and so that a contact state between the arm member 3 and the pulley 2 is variable by means of changing a rotational phase between the pulley 2 and the arm member 3.

As shown in FIGS. 3A and 3B, the shape of the long hole 43 is formed in such a manner that the pin 33 moves smoothly between the first end portion 43a and the second end portion 43b. For example, when the pin 33 moves from the first end portion 43a toward the second end portion 43b, a length of the first spring 41 comes to be gradually reduced. When the pin 33 moves from the second end portion 43b toward the first end portion 43a, the length of the first spring 41 comes to be gradually increased.

According to the first embodiment, the control member 4 controls the arm member 3 so that the arm member 3 and the pulley 2 come in contact with each other or come out of contact from each other, and so that the contact state between the arm member 3 and the pulley 2 is variable. Accordingly, the operation state of the water pump 1 is variable by means of the control of the control member 4. For example, the control member 4 controls the water pump 1 to stop operating when the internal engine is at low temperatures, thereby facilitating the warm-up of the internal engine and improving a fuel efficiency.

According to the first embodiment, the water pump 1 includes the first spring 41 biasing the arm member 3 toward the inner circumferential surface 2a of the pulley 2. Accordingly, the arm member 3 is securely engageable with the pulley 2 due to the biasing force by which the arm member 3 is biased or pushed onto the inner circumferential surface 2a of the pulley 2 and due to the centrifugal force generated by the rotation of the arm member 3 and the pulley 2, thereby allowing transmission of a large torque to the impeller 7.

An operation of a water pump 1a for a vehicle (hereinafter referred to as a water pump 1a) according to a second embodiment will be described hereunder with reference to the illustrations of FIGS. 4 to 6.

In the water pump 1a according to the second embodiment, positions of the first bearing 11 and the magnetic coil 6 are changed relative to those in the water pump 1 according to the first embodiment. Other structures of the water pump 1a according to the second embodiment are identical to those of the water pump 1 according to the first embodiment. In the second embodiment, the identical numerical designations are given to the parts, the portions and the like having identical functions to those of the first embodiment.

Figure 4:
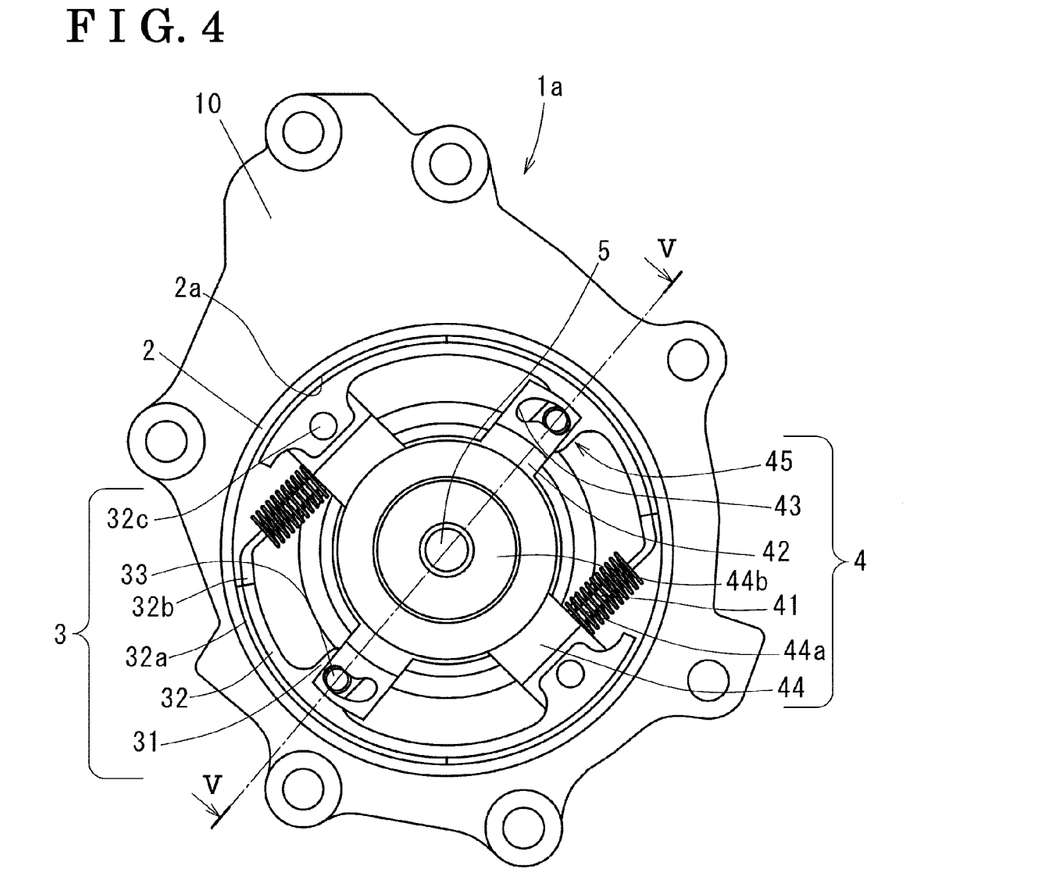
FIG. 4 a detailed view of a structure of a water pump for a vehicle according to a second embodiment disclosed here.
Figure 5:
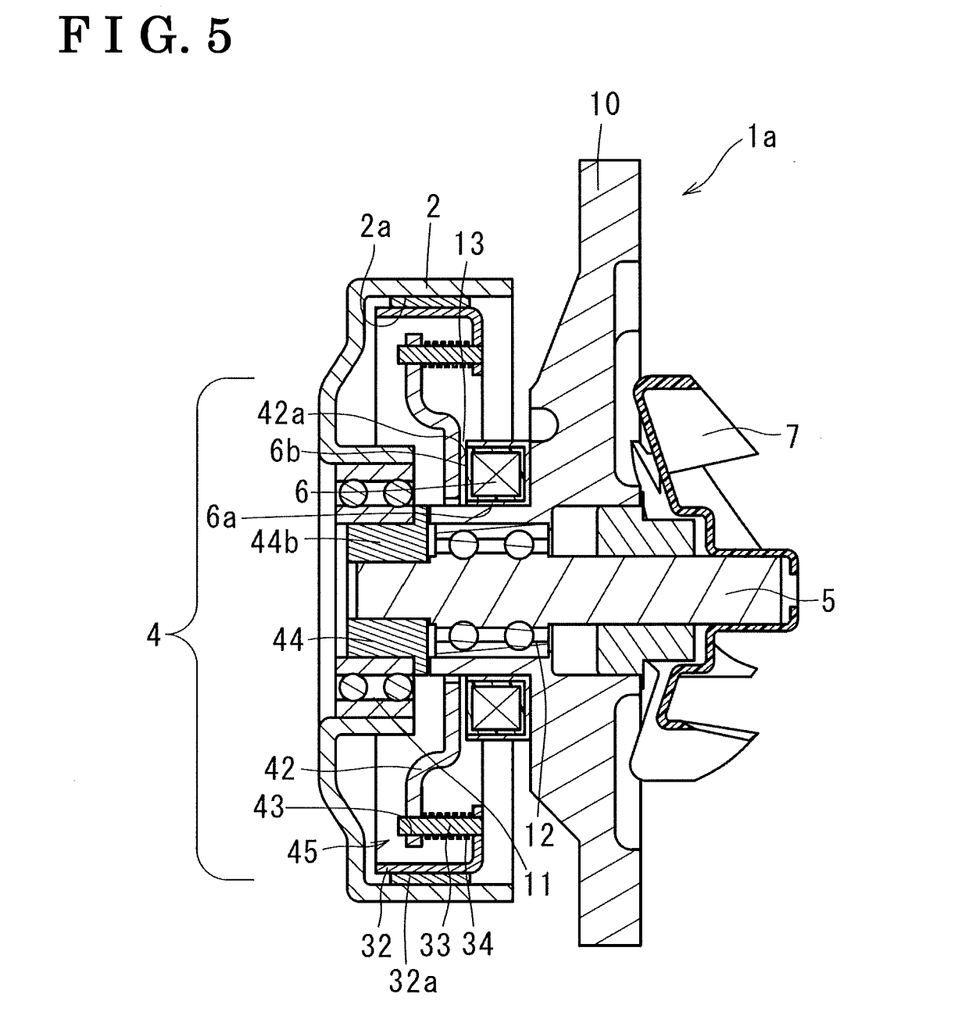
FIG. 5 is a section view taken on line V-V illustrated in FIG. 4.

As shown in FIGS. 4 and 5, the water pump 1a includes the driver 44 having a raised portion 44b provided at an end portion of the driven shaft 5 so as to extend in the axial direction of the driven shaft 5, the first bearing 11 disposed on an outer circumferential surface of the raised portion 44b so as to be positioned between the raised portion 44b of the driver 44 and the pulley 2, and the magnetic coil 6. According to the second embodiment, the position of the magnetic coil 6 is closer to the position of the impeller 7 than in the first embodiment.

Figure 6A:
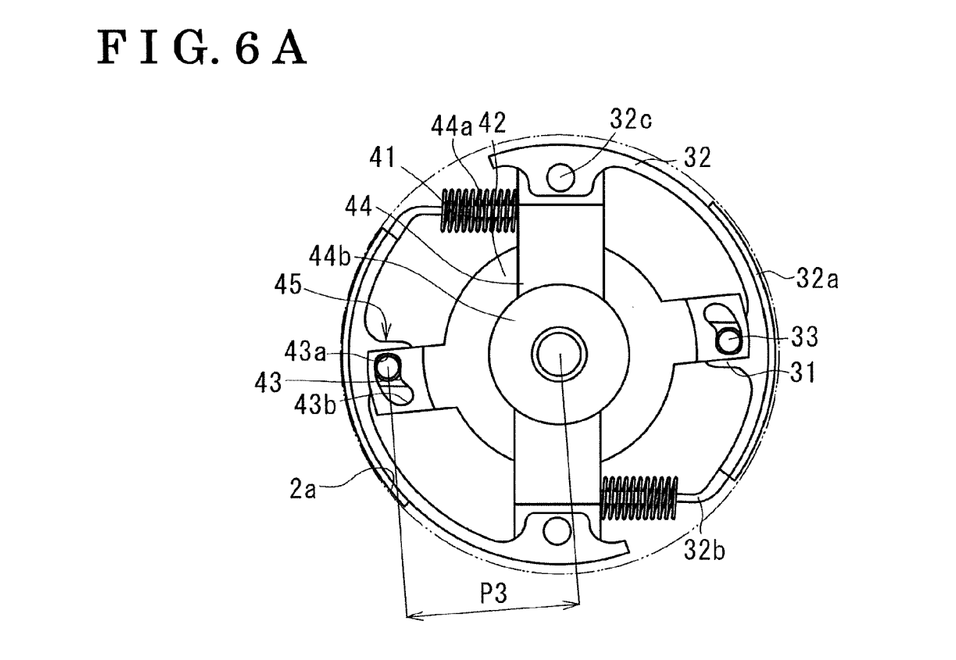
FIG. 6A is a detailed view illustrating operations of an arm member and a control member according to the second embodiment.
Figure 6B:
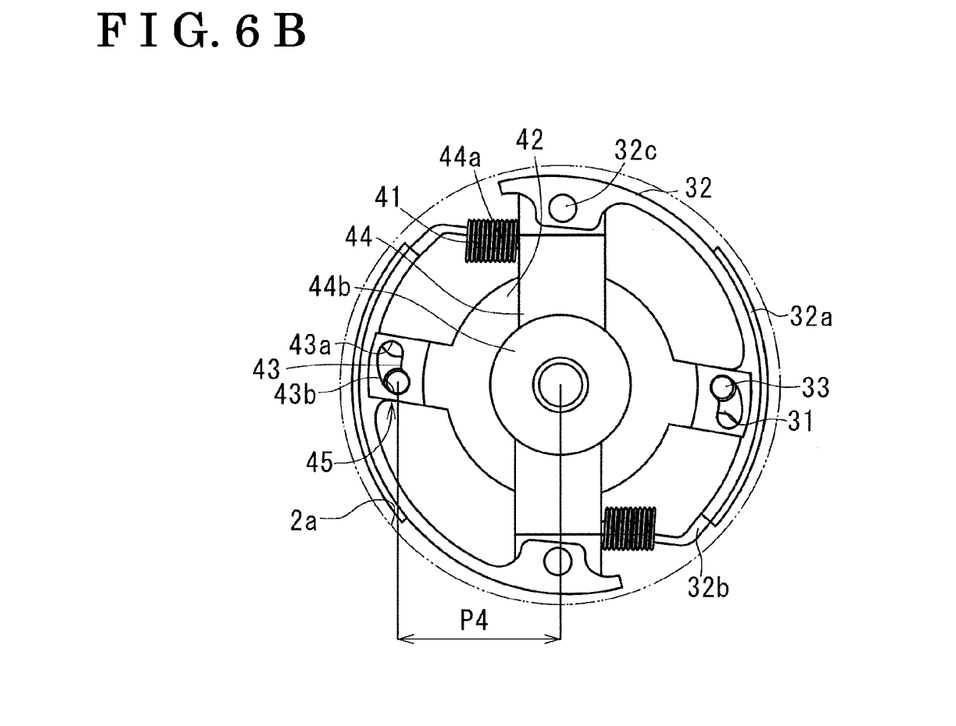
FIG. 6B is a detailed view illustrating the operations of the arm member and the control member according to the second embodiment.

A difference between the first embodiment and the second embodiment is that the distance P1 (FIG. 3A) differs from a distance P3 (FIG. 6A) and that the distance P2 (FIG. 3A) differs from a distance P4 (FIG. 6A). Explanations will be made hereunder about the differences. The long hole 43 is formed in such a manner that the distance P3 and the distance P4 differ from each other. The distance P3 refers to a distance between the pin 33 and the rotation axis of the driven shaft 5 when the pin 33 is positioned at the first end portion 43a of the long hole 43. The distance P4 refers to a distance between the pin 33 and the rotation axis of the driven shaft 5 when the pin 33 is positioned at the second end portion 43b of the long hole 43. The first spring 41 is gradually compressed toward the end portion 44a of the driver 44 by up to a difference between the distance P3 and the distance P4, and thus the frictional portion 32a of the arm member 3 moves away from the inner circumferential surface 2a.

An operation of the water pump 1a according to the second embodiment will be described hereunder. The pulley 2 in the second embodiment rotates counterclockwise in FIG. 4.

When the water pump 1a is in an operating state (an initial state), the magnetic coil 6 is not excited (a de-energized state). The first spring 41 biases the arm member 3 toward the inner circumferential surface 2a of the pulley 2 as shown in FIG. 6A. The frictional portion 32a of the arm member 3 engages with the inner circumferential surface 2a of the pulley 2 and thus rotates with the pulley 2. As the arm member 3 rotates, the rotation of the arm member 3 is transmitted to the impeller 7 via the driven shaft 5, and thus the water pump 1a is operated. When the pulley 2 and the arm member 3 engage and rotate synchronously with each other, the engagement between the pulley 2 and the arm member 3 becomes securer due to the biasing force of the first spring 41 and a centrifugal force generated by the rotation of the arm member 3. When the pulley 2 and the arm member 3 are in the half-engaged state, the rotation of the pulley 2 is transmitted to the arm member 3 while allowing a slippage between the pulley 2 and the arm member 3. Thus, the impeller 7 rotates at a smaller rotation force than that of the pulley 2.

To transit the state of the water pump 1a from the operating state to a stopped state, the magnetic coil 6 comes to be excited (an energized state), thereby attracting the armature 42 toward the attraction face 6b of the magnetic coil 6. When the armature 42 is attracted by the magnetic coil 6 and stops rotating, the pin 33 moves to be positioned at the second end portion 43b of the long hole 43. As the pin 33 moves to be positioned at the second end portion 43b, the frictional portion 32a of the arm member 3 moves away from the inner circumferential surface 2a of the pulley 2 so as to move toward the driven shaft 5, that is, closer to the rotation axis of the pulley 2. In other words, the frictional portion 32a of the arm member 3 pivots about the second connection portion 32c toward the end portion 44a of the driver 44 by up to the difference between the distance P3 and the distance P4 shown in FIGS. 6A and 6B. As the frictional portion 32a of the arm member 3 moves closer to the rotation axis of the pulley 2 and the first connection portion 32b of the arm portion 32 moves toward the end portion 44a of the driver 44, the first spring 41 is compressed by up to the difference between the distance P3 and the distance P4. Consequently, the frictional portion 32a moves away from the inner circumferential surface 2a toward the rotation axis of the pulley 2, and thus transmission of the rotation of the pulley 2 to the impeller 7 is stopped, thereby stopping the operation of the water pump 1a.

Other aspects of the operation of the water pump 1a are identical to those of the water pump 1 according to the first embodiment.

According to the second embodiment, the water pump 1a includes the coil 6 whose position is closer to the position of the impeller 7 than in the first embodiment, and the first bearing 11 disposed between the raised portion 44b of the driver 44 and the pulley 2. Since the magnetic coil 6 is positioned closer to the impeller 7, the magnetic coil 6 is connected to the impeller 7 with a shorter and simpler wire arrangement, which achieves the water pump 1*a* at a lower cost.

According to the second embodiment, the control member 4 controls the arm member 3 so that the arm member 3 and the pulley 2 come in contact with each other or come out of contact from each other, and so that the contact state between the arm member 3 and the pulley 2 is variable. Accordingly, the operation state of the water pump 1*a* is variable by means of the control of the control member 4. For example, the control member 4 controls the water pump 1*a* to stop operating when the internal engine is at low temperatures, thereby facilitating the warm-up of the internal engine and improving the fuel efficiency.

According to the second embodiment, the water pump 1*a* includes the first spring 41 biasing the arm member 3 toward the inner circumferential surface 2*a* of the pulley 2. Accordingly, the arm member 3 is securely engageable with the pulley 2 due to the biasing force by which the arm member 3 is biased or pushed onto the inner circumferential surface 2*a* of the pulley 2 and due to the centrifugal force generated by the rotation of the arm member 3 and the pulley 2, thereby allowing transmission of the large torque to the impeller 7.

According to the first and second embodiments, the first spring 41 is provided at the end portion 44*a* of the control member 44 for biasing the frictional portion 32*a* of the arm member 3 toward the inner circumferential surface 2*a* of the pulley 2. This structure, however, is not limited thereto and the first spring 41 may be provided at any other position between the driver 44 and the arm portion 32. For example, the first spring 41 may be provided at an outer circumference of the second connection portion 32*c* in a manner that the frictional portion 32*a* of the arm member 3 is biased toward the inner circumferential surface 2*a* of the pulley 2 for achieving the similar effect.

According to the first and second embodiments, the second spring 34 is disposed between the arm member 3 and the attraction face 42*a* of the armature 42. This structure, however, is not limited thereto and the second spring 34 may be disposed between the armature 42 and the driver 44 for achieving the similar effect. In this case, the second spring 34 may be a tension spring pulling the armature 42 toward the driver 44.

According to the first and second embodiments, the armature 42 is attracted by (and comes in contact with) the attraction face 6*b* of the magnetic coil 6 when the magnetic coil 6 is energized. However, the position of the second end portion 43*b* of the long hole 43 may be set so that the armature 42 stops moving in the axial direction of the driven shaft 5 before the attraction face 42*a* comes in contact with the attraction face 6*b*. In this case, the attraction face 42*a* of the armature 42 does not come in contact with the attraction face 6*b* of the magnetic coil 6, and thus a reliability of the magnetic coil 6 and the armature 42 improves, thereby facilitating the application of the water pump 1, 1*a* to a vehicle where a high reliability is sought.

According to the embodiments, the water pump 1, 1*a* for the vehicle includes the pulley 2 driven and rotated by the external power, the driven shaft 5 driven to be rotatable independently from the pulley 2, the impeller 7 to which the rotation of the driven shaft 5 is transmitted, the arm member 3 including the frictional portion 32*a* which presses the inner circumferential surface 2*a* of the pulley 2 and being contactable to the pulley 2 for transmitting the rotation of the pulley 2 to the driven shaft 5, the control member 4 controlling the arm member 3 so that the arm member 3 and the pulley 2 come in contact with each other or come out of contact from each other and so that the contact state between the arm member 3 and the pulley 2 is variable, and the first spring 41 provided at the control member 4 for biasing the arm member 3 toward the pulley 2, wherein the control member 4 changes the rotational phase between the pulley 2 and the arm member 3 so that the arm member 3 and the pulley 2 come in contact with each other or come out of contact from each other and so that the contact state between the arm member 3 and the pulley 2 is controlled.

Due to the above described structure, the control member 4 controls the arm member 3 so that the arm member 3 and the pulley 2 come in contact with each other or come out of contact from each other, and so that the contact state between the arm member 3 and the pulley 2 is variable. Accordingly, the operation state of the water pump 1, 1*a* is variable by means of the control of the control member 4. For example, the control member 4 controls the water pump 1, 1*a* to stop operating when the internal engine is at low temperatures, thereby facilitating the warm-up of the internal engine and improving the fuel efficiency.

Due to the above described structure, the water pump 1, 1*a* includes the first spring 41 biasing the arm member 3 toward the inner circumferential surface 2*a* of the pulley 2. Accordingly, the arm member 3 is securely engageable with the pulley 2 due to the biasing force of the first spring 41 by which the arm member 3 is biased or pushed onto the inner circumferential surface 2*a* of the pulley 2 and due to the centrifugal force generated by the rotation of the arm member 3 and the pulley 2, thereby allowing transmission of the large torque to the impeller 7.

According to the embodiments, the control member 4 includes the armature 42 provided with the joint portion 45 which joins to the arm member 3 and the magnetic coil 6 attracting the armature 42 so that the arm member 3 and the pulley 2 come in contact with each other or come out of contact from each other and so that the contact state between the arm member 3 and the pulley 2 is variable.

Due to the above described structure, the magnetic coil 6 attracts the armature 42 for changing the operation state of the water pump 1, 1*a*. As the magnetic coil is used in the embodiments, an amount of the attraction force attracting the armature 42 is variable by changing an amount of electricity supplied to the magnetic coil. Consequently, the arm member 3 is controlled so that the arm member 3 and the pulley 2 come in contact with each other or come out of contact from each other. In addition, when the arm member 3 and the pulley 2 are in contact with each other, the arm member 3 is controlled so that the arm member 3 slides relative to the pulley 2 allowing the slippage therebetween, and thus the number of rotations of the impeller 7 is controlled. By controlling the number of rotation of the impeller 7, an excessive supply of the coolant water to the engine is restricted, thereby maintaining the engine in the appropriately warmed-up state.

According to the embodiments, the joint portion 45 includes the long hole 43 provided at one of the armature 42 and the arm member 3, and the pin 33 provided at the other one of the armature 42 and the arm member 3. The pin 33 is inserted into the long hole 43. The joint portion 45 moves the arm member 3 in the direction away from the pulley 2 when the pin 33 inserted into the long hole 43 moves along the shape of the long hole 43.

Due to the above described structure, the arm member 3 is controlled so that the arm member 3 and the pulley 2 come in contact with each other or come out of contact from each other, and so that the contact state between the arm member 3 and the pulley 2 is variable according to the position of the pin 33 in the long hole 43. Thus, the water pump 1, 1*a* according to the first and second embodiments has a simple structure where the pin 33 is moved along the shape of the long hole 43, which achieves a reduction in size and cost of the water pump 1, 1a without employing a complicated structure.

According to the embodiments, the long hole 43 includes the first end portion 43a and the second end portion 43b restricting the range of the movement of the pin 33.

Due to the above described structure, in case that the arm member 3 moves away from the pulley 2 and the range of the movement of the pin 33 provided at the arm member 3 is restricted by the first end portion 43a or second end portion 43b of the long hole 43, the movement of the arm member 3 is restricted before the armature 42 of the control member 4 comes in contact with the magnetic coil 6. Consequently, the reliability of the magnetic coil 6 and the armature 42 improves, thereby facilitating the application of the water pump 1, 1a to the vehicle where the high reliability is sought.

According to the embodiments, the armature 42 and the magnetic coil 6 form therebetween the air gap 13.

Due to the above described structure, the attraction force generated by the magnetic coil 6 works efficiently on the armature 42, thereby reducing a size of the magnetic coil 6. In addition, an electric power consumption may be saved.

According to the embodiments, the magnetic coil 6 includes the attraction face 6b for applying the attraction force from the magnetic coil 6 to the armature 42. An entire surface of the attraction face 6b faces the armature 42.

Due to the above described structure, the attraction force generated by the magnetic coil 6 works efficiently on the armature 42 without being wasted, thereby reducing the size of the magnetic coil 6. As a result, an electric power consumption may be saved.

According to the embodiments, the arm member 3 comes in contact with the pulley 2 when the magnetic coil 6 is in the stopped state.

Due to the above described structure, the arm member 3 is in contact with the pulley 2 and thus the rotation is transmitted to the impeller 7 via the pulley 2 even when the magnetic coil 6 is damaged and out of operation. Thus the coolant water is always pumped to the portions, for example, the internal combustion engine, of the vehicle where the water coolant is needed, thereby preventing a functional deterioration due to overheating.

According to the embodiments, the water pump 1, 1a for a vehicle includes the pulley 2 driven and rotated by the external power, the driven shaft 5 driven to be rotatable independently from the pulley 2, the impeller 7 to which the rotation of the driven shaft 5 is transmitted, the arm member 3 for transmitting the rotation of the pulley 2 to the driven shaft 5, the frictional portion 32a provided on the arm member 3 and positioned to face the inner circumferential surface 2a of the pulley 2, the control member 4 controlling the arm member 3, and the first spring 41 biasing the arm member 3 toward the pulley 2, wherein the first spring 41 allows the inner circumferential surface 2a of the pulley 2 and the frictional portion 32a to come in contact with each other when the arm member 3 is under no control of the control member 4 and wherein the first spring 41 allows the inner circumferential surface 2a of the pulley 2 and the frictional portion 32a to come out of contact from each other when the arm member 3 is under the control of the control member 4.

Due to the above described structure, the operation state of the water pump 1, 1a is variable by means of the control of the control member 4. For example, the control member 4 causes the water pump 1, 1a to stop operating when the internal engine is at low temperatures, thereby facilitating the warm-up of the internal engine and improving the fuel efficiency.

Due to the above described structure, the water pump 1, 1a includes the first spring 41 biasing the arm member 3 toward the inner circumferential surface 2a of the pulley 2. Accordingly, the arm member 3 is securely engageable with the pulley 2 due to the biasing force by which the arm member 3 is biased or pushed onto the inner circumferential surface 2a of the pulley 2 and due to the centrifugal force generated by the rotation of the arm member 3 and the pulley 2, thereby allowing transmission of the large torque to the impeller 7.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A water pump for a vehicle, comprising:
a power transmission member driven and rotated by an external power;
a driven shaft driven to be rotatable independently from the power transmission member;
an impeller to which a rotation of the driven shaft is transmitted;
an arm member including a pressing portion which presses an inner circumferential surface of the power transmission member and being contactable to the power transmission member for transmitting a rotation of the power transmission member to the driven shaft;
a control member controlling the arm member so that the arm member and the power transmission member come in contact with each other or come out of contact from each other and so that a contact state between the arm member and the power transmission member is variable, the control member including a magnetically-attractable portion provided with a joint portion which is joined to the arm member; and
a biasing member provided at the control member for biasing the arm member toward the power transmission member, wherein
the control member changes a rotational phase between the power transmission member and the arm member so that the arm member and the power transmission member come in contact with each other or come out of contact from each other and so that the contact state between the arm member and the power transmission member is controlled,
the joint portion includes a long hole provided at one of the magnetically-attractable portion and the arm member and a pin provided at the other one of the magnetically-attractable portion and the arm member, and
a distance between a center of the pin and a center of the driven shaft when the pin is positioned at a first end portion of the long hole and a distance between the center of the pin and the center of the driven shaft when the pin is positioned at a second end portion of the long hole differ from each other.

2. The water pump for the vehicle according to claim 1, wherein the control member further includes a driving portion operable to magnetically attract the magnetically-attractable portion so that the arm member and the power transmission member come in contact with each other or come out of contact from each other and so that the contact state between the arm member and the power transmission member is variable.

3. The water pump for the vehicle according to claim 2, wherein
the joint portion moves the arm member in a direction away from the power transmission member when the pin inserted into the long hole moves along a shape of the long hole.

4. The water pump for the vehicle according to claim 2, wherein the magnetically-attractable portion and the driving portion form therebetween an air gap.

5. The water pump for the vehicle according to claim 3, wherein the magnetically-attractable portion and the driving portion form therebetween an air gap.

6. The water pump for the vehicle according to claim 2, wherein the driving portion includes an attraction face for applying an attraction force from the driving portion to the magnetically-attractable portion, an entire surface of the attraction face facing the magnetically-attractable portion.

7. The water pump for the vehicle according to claim 3, wherein the driving portion includes an attraction face for applying an attraction force from the driving portion to the magnetically-attractable portion, an entire surface of the attraction face facing the magnetically-attractable portion.

8. The water pump for the vehicle according to claim 4, wherein the driving portion includes an attraction face for applying an attraction force from the driving portion to the magnetically-attractable portion, an entire surface of the attraction face facing the magnetically-attractable portion.

9. The water pump for the vehicle according to claim 5, wherein the driving portion includes an attraction face for applying an attraction force from the driving portion to the magnetically-attractable portion, an entire surface of the attraction face facing the magnetically-attractable portion.

10. The water pump for the vehicle according to claim 2, wherein the arm member comes in contact with the power transmission member when the driving portion is not operating to magnetically attract the magnetically-attractable portion.

11. The water pump for the vehicle according to claim 3, wherein the arm member comes in contact with the power transmission member when the driving portion is not operating to magnetically attract the magnetically-attractable portion.

12. The water pump for the vehicle according to claim 5, wherein the arm member comes in contact with the power transmission member when the driving portion is not operating to magnetically attract the magnetically-attractable portion.

13. The water pump for the vehicle according to claim 4, wherein the arm member comes in contact with the power transmission member when the driving portion is not operating to magnetically attract the magnetically-attractable portion.

14. The water pump for the vehicle according to claim 6, wherein the arm member comes in contact with the power transmission member when the driving portion is not operating to magnetically attract the magnetically-attractable portion.

15. A water pump for a vehicle, comprising:
a power transmission member driven and rotated by an external power;
a driven shaft driven to be rotatable independently from the power transmission member;
an impeller to which a rotation of the driven shaft is transmitted;
an arm member for transmitting a rotation of the power transmission member to the driven shaft;
a pressing portion provided on the arm member and positioned to face an inner circumferential surface of the power transmission member;
a control member including a magnetically-attractable portion provided with a joint portion which is joined to the arm member; and
a biasing member biasing the arm member toward the power transmission member, wherein
the biasing member allows the inner circumferential surface of the power transmission member and the pressing portion to come in contact with each other when the arm member is in a state in which it is not controlled by the control member,
the biasing member allows the inner circumferential surface of the power transmission member and the pressing portion to come out of contact from each other when the arm member is in a state in which it is controlled by the control member,
the joint portion includes a long hole provided at one of the magnetically-attractable portion and the arm member and a pin provided at the other one of the magnetically-attractable portion and the arm member, and
a distance between a center of the pin and a center of the driven shaft when the pin is positioned at a first end portion of the long hole and a distance between the center of the pin and the center of the driven shaft when the pin is positioned at a second end portion of the long hole differ from each other.

* * * * *